June 6, 1967 P. RABANIT 3,323,432
MULTIPLE EXPOSURE CAMERA
Original Filed July 26, 1963 7 Sheets-Sheet 1

INVENTOR
PAUL RABANIT
BY Hammond & Littell
ATTORNEYS

June 6, 1967  P. RABANIT  3,323,432
MULTIPLE EXPOSURE CAMERA
Original Filed July 26, 1963  7 Sheets-Sheet 7

INVENTOR
PAUL RABANIT
BY *Hammond & Littell*
ATTORNEYS

United States Patent Office 3,323,432
Patented June 6, 1967

3,323,432
MULTIPLE EXPOSURE CAMERA
Paul Rabanit, 2 Rue Rosa-Bonheur, Paris, France
Original application July 26, 1963, Ser. No. 297,838. Divided and this application Sept. 28, 1965, Ser. No. 497,588
9 Claims. (Cl. 95—18)

This application is a division of my copending U.S. patent application Ser. No. 297,838, filed July 26, 1963, now abandoned.

The present invention relates to an improved camera and more particularly to an optical and mechanical device which can be adapted to a camera of size preferably greater than 6 cm. x 8 cm. and which permits of obtaining on a single emulsified plate either a plurality of photographs of identical or different size, or a plurality of similar photographs obtained with a single shutter operation or different photographs obtained with several shutter operations.

Such a device is particularly suitable for use with a "Polaroid" type of camera back, but of course it will be understood that this specific application is not to be considered a limitation on the scope of the invention, which enables at least two photographs to be obtained on any given sensitive surface.

A camera according to the invention includes in particular at least two lenses to which are associated a corresponding number of printing chambers, which chambers are sealed and equipped with shutter means.

In cases where it is desired to obtain simultaneously a plurality of photographs of identical size or of different sizes on a same sensitive surface, it is preferable in accordance with the present invention to synchronize the control means of the diaphragms of the various lenses and to likewise synchronize the shutters disposed respectively in each printing chamber associated to each lens.

In synchronizing the shutters it can be of advantage to utilize disc-shutters, drop-shutters, or roll-shutters, mounted on supports common to a plurality of lenses. In accordance with one possible embodiment of the invention, however, in the case for instance where it is desired to obtain four similar photographs, recourse is had to two shutters placed behind the lenses and mounted on a shaft lying in the plane containing the optical axes of two of the lenses. A convenient control means permits of simultaneously pivoting the two shutters through a 90-degree arc. Thus, in their blanking off position, the two shutters mask the four exposure chambers associated to the four lenses, whereas when the photograph is taken, said shutters pivot through ninety degrees and align themselves exactly along the optical axis without the slightest trace of these shutters or their shafts appearing on the printed photographs.

The control means of said shutters can include a link which is connected to the shaft of each shutter and is controlled directly by a metal rod which resopnds to the pressure of the operator's finger. Said rod can embody a notch which cooperates with an elastic member for setting the "armed" position, said rod acting on said links and reverting to the "non-armed" position as soon as the elastic member ceases to cooperate with said rod.

In order to make it easier to focus lenses with parallel axes, it is preferable to equip the camera with a sighting lens which is parallel to the photographing lenses and comprises a ground glass. This focusing and framing lens could possibly control all the photographing lenses directly in synchronism.

In accordance also with a particularity of this invention, the lenses are fixed onto a common mounting-plate adapted to be moved forward and backwards relative to the sensitive surface to enable the picture to be brought into focus.

In accordance with another particularity of the invention, means are provided to ensure that the mounting-plate carrying the lenses travels in parallelism with itself. One specific embodiment of these means involves guiding said mounting-plate along two slideways rigid with the case and each equipped with a rack, the two racks being actuated by a single shaft.

In accordance with a further particularity of the invention, each lens possesses its own diaphragm, and these diaphragms are operated jointly by a single control means at the user's disposal.

In a preferred embodiment, the shutter is common to all the lenses and consists of a screen which winds onto two rolls biased, preferably by torsion springs, into the stretched position, said screen embodying conveniently located holes.

The invention thus permits of obtaining a plurality of photographs simultaneously, for instance four photographs measuring 36 mm. x 48 mm. on a film measuring 80 mm. x 105 mm. The invention thus includes in its scope multiple photographs obtained by a camera executed according to the present invention.

Other features of the invention, together with the foregoing, will be set forth in the following description given with reference to the accompanying drawings, which are filed by way of non-limitative examples and in which.

Figure 1:
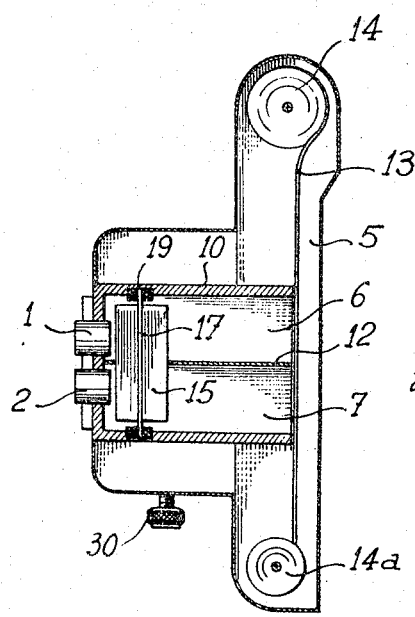
FIGURES 1 to 3 show respectively in section, side elevation and sectional plan view, an embodiment of the invention.
Figure 2:
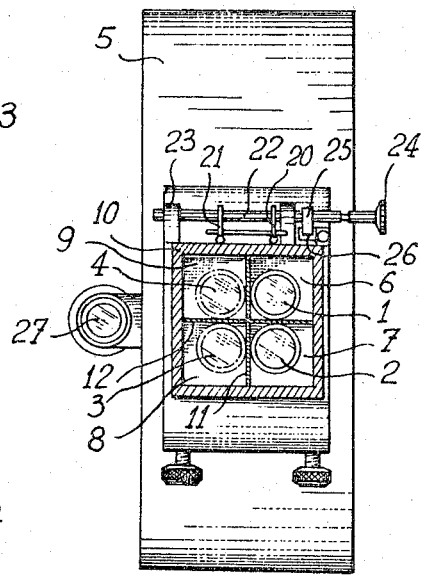
Figure 3:
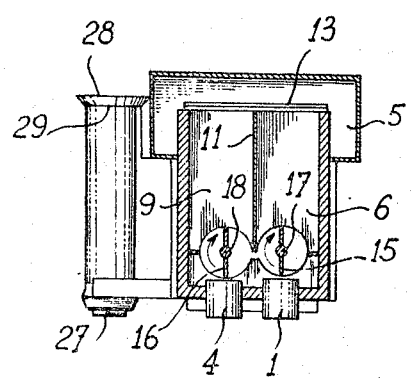

The camera shown in FIGURES 1 to 3 is a camera with four photographic lenses 1 through 4, particularly suited for equipping with a standard "Polaroid" type back 5. It is to be understood, however, that this invention is likewise applicable to other sensitive surfaces operating by transfer, development, contact or reversal, be they in the form of a film, or a paper or cardboard support; neither is the invention limited only to a four-lens camera, for such lenses can number two, three, five, six, or more.

The lenses are preferably of short focal length, an example being about 75 mm. with an aperture ratio of 1:3.5. Behind said lenses the camera comprises printing chambers 6, 7, 8 and 9, equal in number to the number of lenses. These chambers are bounded by a sealing case 10 within which are disposed two mutually perpendicular partitions 11 and 12, hereinafter referred to as the vertical and horizontal partitions, respectively. These chambers extend towards the rear of the camera, up to the plane of the film 13 wound onto spools 14 and 14a.

Partition 12 embodies two circular indents to permit pivotal motion of two shutters 15 and 16. Shutter 15 is supported on a shaft 17 and serves to simultaneously blank off the two chambers 6 and 7, while shutter 16 is supported on a shaft 18 and serves to simultaneously blank off chambers 8 and 9 positioned immediately behind the lenses associated to these chambers. Shafts 17 and 18 are supported in ball-bearings 19 and lie in the planes containing the optical axes of lenses 1, 2 and 3, 4 respectively.

A single control permits of simultaneously pivoting the two shutters from an obturating position up to a film exposing position (shown in FIGURE 3) wherein the shutters lie exactly in the planes passing through the optical axes of the lenses, as stated precedingly. Said control comprises links 20 and 21 associated to shafts 17 and 18 respectively and controlled by a rod 22 which is supported on yokes 23 rigid with the camera. Said rod is parallel with horizontal partition 12, i.e. perpendicular to shafts 17 and 18, and terminates in a shutter release button 24 positioned conveniently at the operator's disposal. Rod 22 carries a flyweight 25 serving to release an arming spring 26 which permits different exposure times. By cooperating with a notch on rod 22, spring 26, which can be a steel blade for instance, sets the "armed" position. As soon as said blade is released, rod 22 reverts to the "non-armed" position under the action of a spring such as a coil spring (not shown).

The camera is preferably completed by a sighting lens 27 mounted laterally and comprising an ocular sight 28 with a ground glass 29. This sighting lens permits focusing and framing. It comprises with advantage a control means for simultaneously rotating the diaphragm, speed and other setting rings of lenses 1 through 4. By way of example, the four lenses could have their focusing rings rotated by pinions which so intermesh that rotation of any single such pinion causes rotation of the other three. This enables the control means of the four lenses to be coupled to the optical sight control whereby to permit simultaneous focusing of the four photographing lenses. The camera could additionally include a variety of accessories, such as tripod securing screws 30.

The manner of operation of the camera described will be apparent from the foregoing description. The shutter time is obtained by a quarter-turn, i.e. 90°, through which pivot the shutters 15 and 16, allowing the light rays to reach the film 13 in each chamber bounded by the case 10 and the vertical and horizontal partitions 11 and 12. This 90° rotation is imparted by the shutter shafts 17 and 18, which are acted upon by the two links 20 and 21 directly controlled by the metal rod 22 responding to the operator's finger pressure. Rod 22, which is made, say, of stainless steel 5 mm. in diameter, is surrounded by the coil spring which urges it back to the unarmed position after each shutter operation. On this spring acts a brake permitting different exposure times. As indicated previously, a notch on rod 22 allows the spring blade 26 to engage therein, whereby to set the armed position. As soon as blade 26 is released, rod 22 reverts to the unarmed position, but in so doing acts on the links controlling the shutters, thus causing the four photographs to be taken at once.

Figure 4:
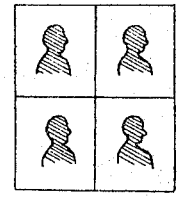
FIGURE 4 shows schematically an example of the photographs that can be obtained with a camera according to the invention.

The print obtained thus is shown diagrammatically in FIGURE 4. By way of example, four identical identity-card photographs, or four art photographs (identical or otherwise) of 36 mm. x 48 mm. frame size on a film of 80 mm. x 105 mm. frame size can be taken. Of course, top-quality lenses must be used and the printing chambers must be so designed that they begin as close as possible to the shutter and extend up to the level of the sensitive surface. The diaphragms utilized can be synchronized iris-diaphragms associated to each lens. As indicated precedingly, adjustment of any one of the diaphragms will automatically cause all the others to be set to the desired stop also.

In the alternative embodiment shown in FIGURES 5 through 10, the camera according to the invention consists of two sections, to wit a front portion 31 and a back 32, the joining line of which lies for all practical purposes in the plane of the film. In the embodiment illustrated, the front portion 31 (FIGURE 5) comprises four lenses 34 supported in a piece of sheet-metal 35 rigidly united to a front mounting-plate 37 by means of screws 36. It is of course to be understood that although preference has been given to a camera equipped with four lenses, it would by no means be departing from the scope of the invention to apply the features disclosed hereinafter to a camera equipped with two, three or five lenses, or with an even larger number of lenses.

The four diaphragms (not shown) associated to the four lenses are controlled jointly, for instance by means of a single pinion mounted on the shaft of the diaphragms control knob 38.

Figure 5:
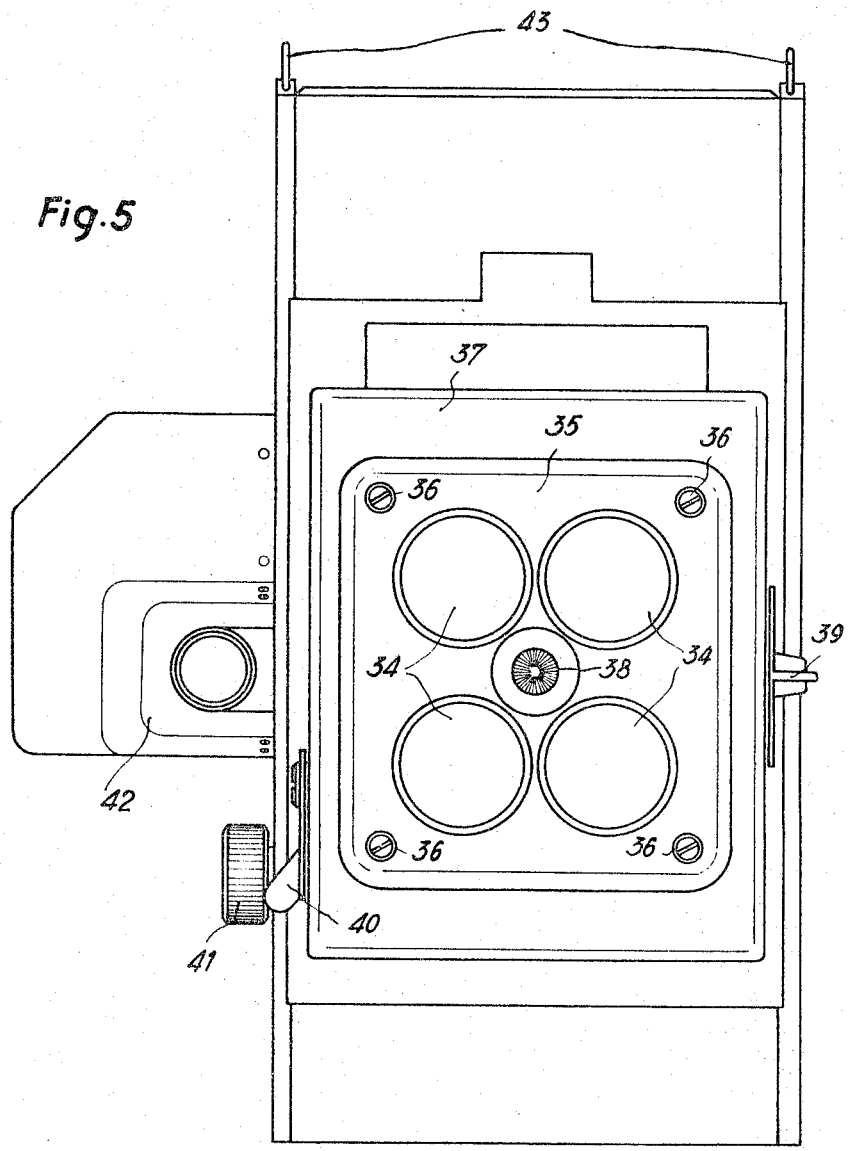
FIGURE 5 shows in front elevation an alternative embodiment of the camera according to the invention.

On the right-hand side of FIGURE 5 is to be seen the arming knob 39 and, on the left-hand side, the shutter release lever 40, the focusing knob 41 and the sighting assembly 42. Lastly, two securing rings 43 are provided at the top of the camera.

Figure 7:
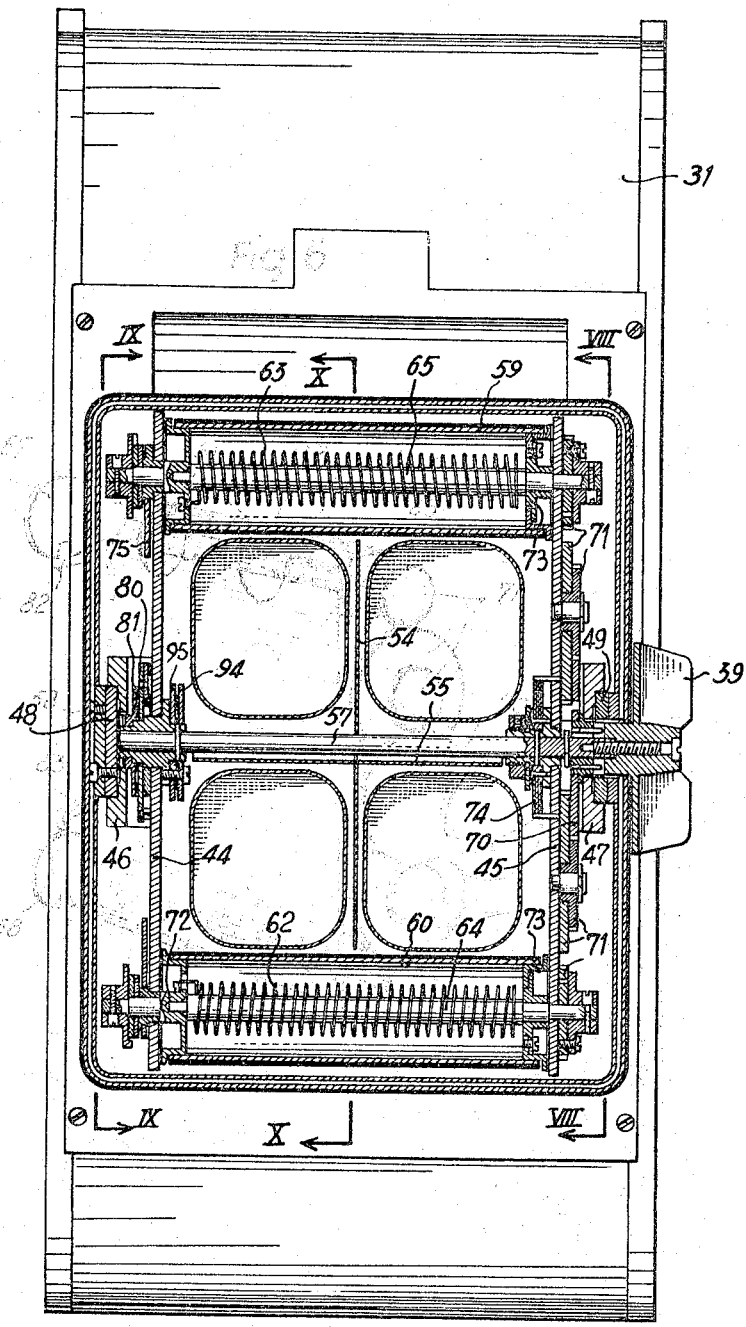
FIGURE 7 is a sectional view of the inside of the camera according to FIGURE 5 and of the shutter mechanism in particular, the section being taken through two planes passing respectively through the axes of the rolls and through the axis of the arming knob.
Figure 8:
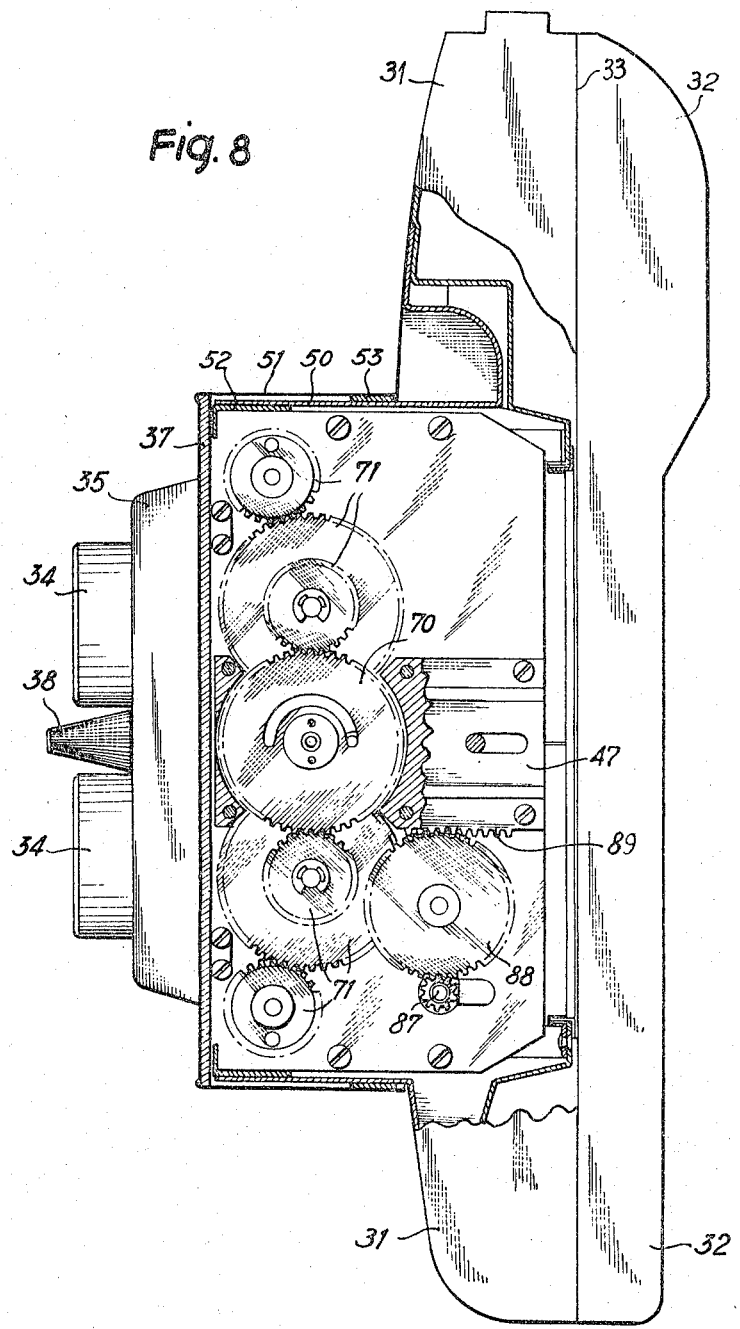
FIGURE 8 is a sectional view through the line VIII—VIII of FIGURE 7, showing the arming device in particular.

The mounting-plate 37 supporting the lenses is extended on either side by flanges 44 and 45 (see FIGURE 7). To the central parts of said flanges are secured slides 46 and 47 adapted to travel along slideways 48 and 49 rigid with the camera case 50. A piece of sheet-metal 51 which covers the front mounting-plate 37 and the entire mechanism fixed to flanges 44 and 45, and a piece of sheet-metal 52, which is fixed to front mounting-plate 37 enclose the camera case 50 and seal off the camera against light, dampness and dust, and this tightness is made complete by a gasket 53 inserted between sheets 50 and 51 (see FIGURES 8 and 9). The dark chamber is divided by a longitudinal partition 54 and a transverse partition 55 into four chambers corresponding to the four lenses (FIGURE 7). Partition 55 is indented at 56 to provide passageway for the shaft 57 of arming knob 39 (see FIGURE 10).

Figure 6:
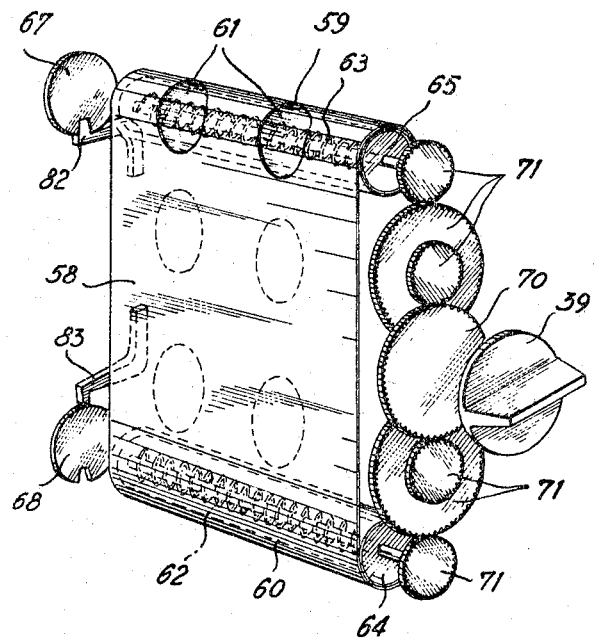
FIGURE 6 is a perspective view of the shutter mechanism of the camera shown in FIGURE 5.

The shutter device is illustrated schematically in FIGURE 6 and its position within the camera can be seen from FIGURE 7. This device comprises a screen 58 wound onto two rolls 59 and 60 and containing two holes 61. The screen can be made with advantage of rubberized fabric and preferably of rubberized silk. Within the two hollow rolls 59 and 60 are positioned two springs 62 and 63 adapted to work in tension. Said springs can be wound in opposite directions about the roll shafts 64 and 65 and have one of their extremities attached to the shaft and the other to the corresponding roll. These springs are designed to provide optimum screen tautness, and when the screen has $n$ turns wound onto one of the rolls, say onto the upper roll in FIGURE 6, spring 63 subjects the upper roll to a torque K tending to unwind the screen from that upper roll; at the same time, the screen will have unwound by $n$ turns off the lower roll and spring 62 subjects this roll to a torque K tending to wind said screen onto the lower roll. These two torques add up but are neutralized, once the screen has been wound up, by a retaining catch 82 (or 83, as the case may be) which engages into a wheel 67 or 68, respectively, supported on the shafts of the corresponding roll 59 or 60.

The device for winding on the screen includes a single control means consisting of the arming knob 39 which is rigid, say, with a gearwheel 70 driving the two shafts 64 and 65 of rolls 59 and 60 in the same direction through the medium of gearwheels 71. When the retaining catch 82 or 83 associated to the corresponding roll is released, the screen unwinds rapidly under the effect of the two torques onto the other roll, and the holes 61 travel past the lenses in succession.

A preferred embodiment of this shutter is shown in FIGURE 7. The rolls 59 and 60 are hollow cylinders closed at both ends by means of fittings of different shapes. On the left of FIGURE 7 the fittings 72 act as pivots for shafts 64 and 65, while on the right of FIGURE 7 the fittings 73 are loosely mounted on shafts 64 and 65, in consequence whereof the shafts and the rolls are not directly interconnected in rotation. The coupling between the rolls and the shafts is effected by means of the springs 62 and 63. One one of the flanges, for instance on flange 45, the ends of shafts 64 and 65 are linked in driven relation to arming knob 39 through gearwheel 70 and the set of gears 71.

Figure 9:
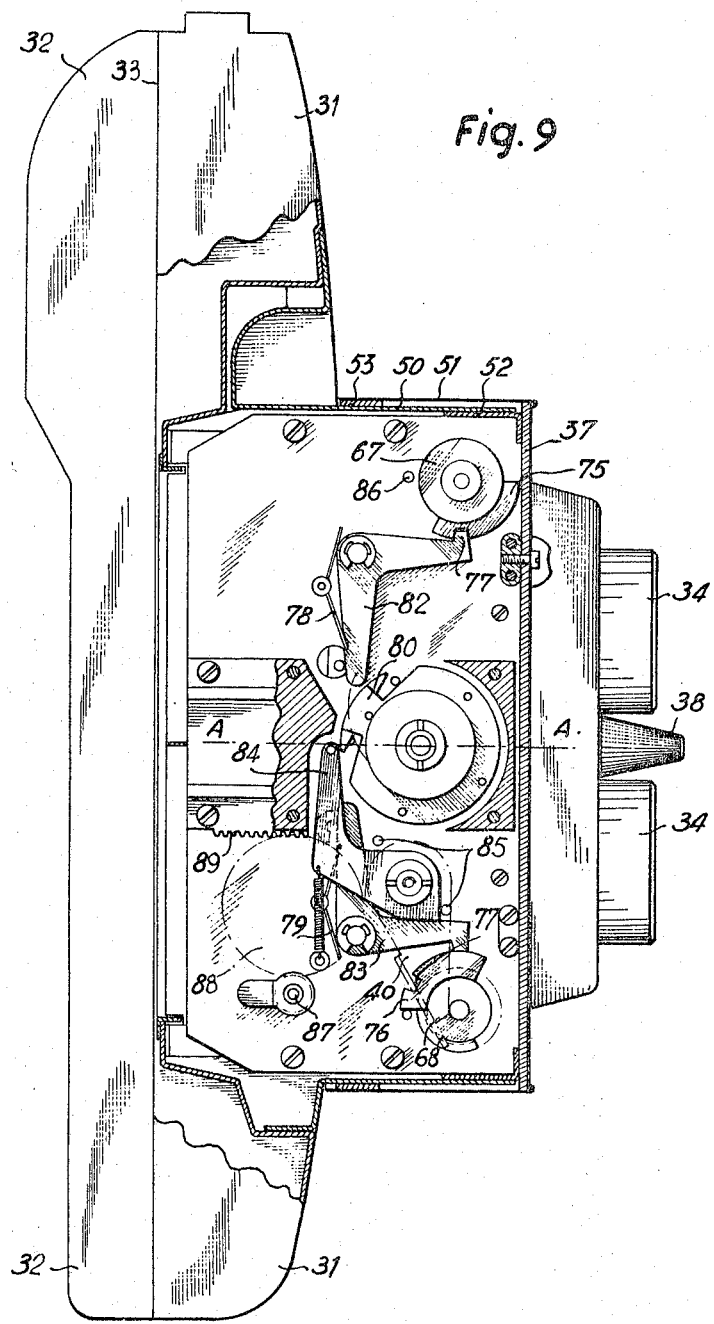
FIGURE 9 is a section through the line IX—IX of FIGURE 7, showing in particular the shutter release device.

Rotation of arming knob 39 is restrained by a brake 74 consisting of a stack of discs which are rotated by the shaft 57 of knob 39 but which are slidable thereon, whereby to be pressed against staationary discs rigid with the flange. The shutter release device can be designed in accordance with the embodiment shown in FIGURE 9. Thus, it could comprise stop-wheels 67 and 68 having cams 75 and 76 driven through friction by the rolls. Each such cam embodies an indent 77 into which engages the corresponding arresting catch 82 or 83. These catches are urged into pressure contact by springs 78 and 79. A rocker device 80 is adapted to assume either of two positions according to the direction of rotation of arming knob 39. The device 80 is rotated by the shaft 57 of knob 39 through a clutch 81 which can be seen on FIGURE 7. When device 80 is in the top position and the upper part of an engagement arm 84 controlled by lever 40 bears against the rocker, as shown in FIGURE 9, said device 80 permits of acting on catch 82 whereby to free the wheel 75 and thus cause the screen to unwind under the action of the two springs 62 and 63.

The lower cam 76 then presents its indented portion 77 to the arresting catch 83. When knob 39 is rearmed in the other direction, the rocker system assumes a symmetrical position relative to the axis A/A.

The engagement device is completed by various stops, such as stops 85 for limiting the movement of engagement arm 84 and stops such as 86 for limiting the rotation of cams 75 and 76 respectively.

The device for displacing the mounting plate supporting the lenses is controlled by a knob 41 fixed to a shaft 87 which, through two pinions 88, moves the two racks 89 rigid with the slides 46 and 47.

This control means ensures that the lens mounting-plate is moved rigorously parallel with itself when the image is being focussed.

Figure 10:
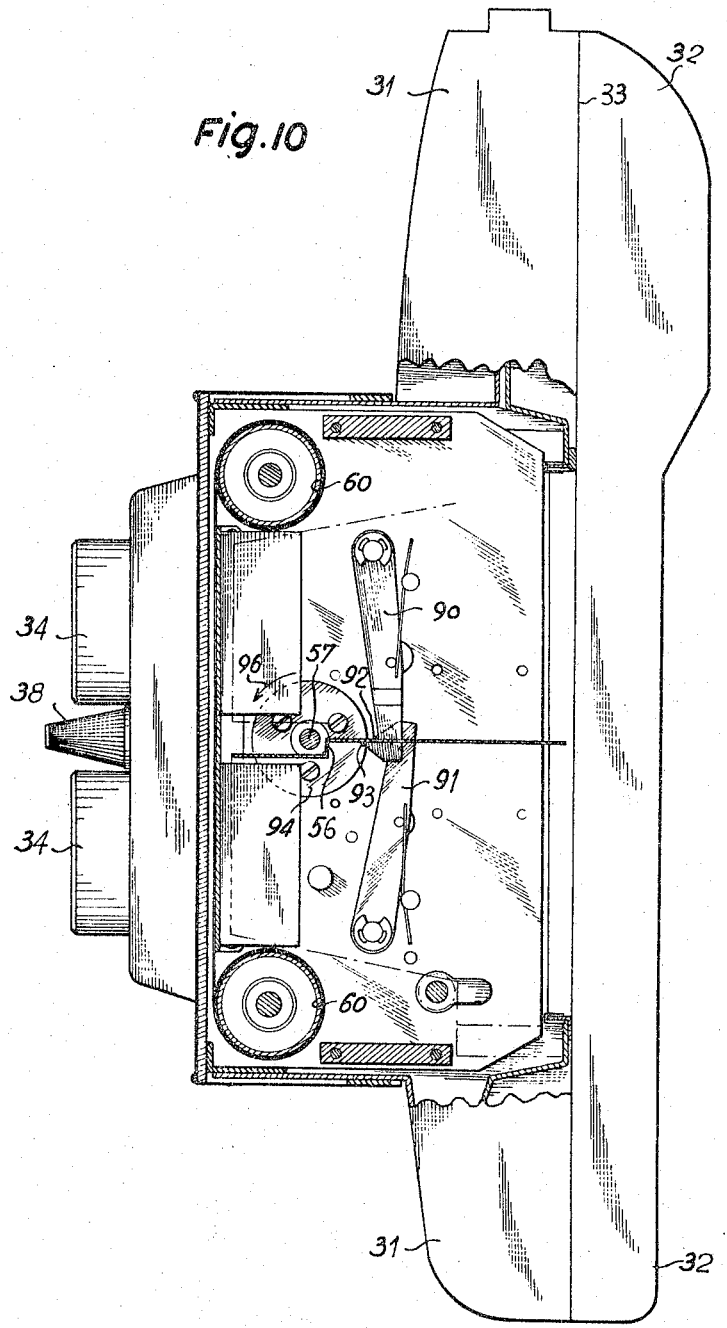
FIGURE 10 is a section through the line X—X of FIGURE 7, illustrating in particular a safety device for ensuring the correct sequence of the arming and tripping operations.

FIGURE 10 illustrates a safety device which should preferably be used to ensure the correct disposition of the various components and the proper sequence in the arming and tripping operations, in the two directions alternately. This device comprises two engagement arms 90 and 91, the extremities 92 and 93 of which are catches having inclined faces adapted to cooperate with recessed portions of wheels 94 and 95 angularly rigid with the arming knob shaft.

These engagement arms are subjected to the action of suitable springs, in such manner that, in the case of FIGURE 10 for example, the wheels 94 and 95 be able to turn only in the direction of arrow 96. After the arming knob has been rotated through half a turn, the catch on arm 91 engages into the recess on wheel 95, thus preventing the shaft from rotating any further in that direction, in consequence whereof the next arming operation will have to be made in the other direction.

Thus it will be appreciated that operation of the arming knob in either direction (depending on the position of the safety device) causes the roll to wind up to the limit of its possible travel, in conjunction with rotation of the rocker system. When the release device is depressed, the screen is freed and winds onto the other roll. When it is desired to take a fresh set of four photographs, the springs 62 and 63 are tensioned by a half-turn on arming knob 39, whereupon the camera is in the armed position.

It goes without saying that the specific embodiments hereinbefore described are given by way of example only and that many modifications and substitutions of parts could be made therein without departing from the spirit and scope of the present invention.

I claim:
1. A camera enabling a plurality of photographs to be obtained simultaneously on a sensitive surface, said camera comprising a camera case, at least two lenses having substantially parallel optical axes in the same plane and to which are associated a corresponding number of chambers which are sealed and equipped with a common shutter device behind said lenses comprising a single flap pivotable in the middle about a shaft lying in said plane of optical axes, across said chambers and substantially perpendicular to said optical axes, control means to pivot said flap about said shaft from an obturating position to an exposure position wherein said flap substantially lies in said plane of optical axes.

2. The camera of claim 1 wherein said chambers associated with said lenses in the same plane have common partitions having an indent therein allowing pivoted motion of said flap.

3. The camera of claim 1 wherein said control means comprises a link connected to said shaft and means to control said link through a rod responsive to pressure.

4. The camera of claim 3 wherein said means to control said link comprises a rod connected to said link, an elastic member cooperating with a notch on said rod and means to set said rod in an armed position by cooperation of said elastic member, said rod acting on said link when in armed position and reverting to a non-armed position thereafter.

5. The camera of claim 1 wherein said shaft is supported in ball-bearings on two opposite outside walls of said chambers.

6. A camera enabling a plurality of photographs to be obtained simultaneously on a sensitive surface, said camera comprising a camera case, at least two lenses having substantially parallel optical axes in the same plane and to which are associated a corresponding number of chambers which are sealed and equipped with a common shutter device behind said lenses comprising a single flap pivotable in the middle about a shaft lying in said plane of optical axes, across said chambers and substantially perpendicular to said optical axes, and at least two other lenses having substantially parallel optical axes in a second plane and to which are associated a corresponding number of other chambers which are sealed and equipped with another common shutter device behind said other lenses comprising a second single flap pivotable in the middle about a second shaft lying in said second plane of optical axes, across said other chambers and substantially perpendicular to said optical axes of said other lenses, synchronized control means to pivot said flap about said shaft and simultaneously to pivot said second flap about said second shaft whereby each flap is pivoted from an obturating position to an exposure position wherein said flap substantially lies in said plane of optical axes and said second flap substantially lies in said second plane of optical axes.

7. The camera of claim 6 wherein said synchronized control means comprises a link connected to the shaft of each flap and means to control said link through a rod responsive to pressure.

8. The camera of claim 7 wherein said means to control said link comprises a rod connected to said link, an elastic member cooperating with a notch on said rod and means to set said rod in an armed position by cooperation of said elastic member, said rod acting on said link when in armed position and reverting to a non-armed position thereafter.

9. A camera enabling a plurality of photographs to be obtained on a sensitive surface, said camera comprising a camera case, a first set of two lenses and a second set of two lenses, each of said sets of two lenses having substantially parallel optical axes in the same plane, a sealed case, four chambers obtained by dividing said sealed case by two mutually perpendicular partitions, a first shutter device behind said first set of two lenses and common to two of said chambers, a second shutter device behind said second set of two lenses and common to the other two of said chambers, said shutter devices each comprising a single flap pivotable in the middle about a shaft lying in the plane of said corresponding set of two lenses and substantially perpendicular to said optical axes of said corresponding set of two lenses, one of said partitions having two indents therein allowing pivotal motion of said flaps, synchronized control means to pivot each of said flaps about each of said shafts, whereby each of said flaps is simultaneously pivoted from an obturating position to an exposure position wherein each of said flaps substantially lies in each of said planes of optical axes.

References Cited

UNITED STATES PATENTS

| | | | |
|---|---|---|---|
| 433,746 | 8/1890 | Schneider | 95—45 X |
| 2,003,754 | 6/1935 | Miller | 95—18 X |
| 2,042,983 | 6/1936 | Fairchild | 95—18 |
| 2,214,228 | 9/1940 | Eppensteiner | 95—18 |
| 2,530,793 | 11/1950 | Thomas | 95—18 X |
| 2,896,522 | 7/1959 | Stein | 95—1.1 |
| 3,103,863 | 9/1963 | Bach | 95—58 |
| 3,128,685 | 4/1964 | Kitrosser | 95—18 |

JOHN M. HORAN, *Primary Examiner.*